United States Patent Office 3,197,434
Patented July 27, 1965

---

3,197,434
POLYCARBONAMIDES FROM ORGANIC DICARBOXYLIC ACIDS AND BIS(AMINOPROPOXYARYL)ALKANES AND PROCESS FOR PRODUCING THE SAME
Jack Preston, William A. H. Huffman and Ralph W. Smith, Decatur, Ala., assignors, by mesne assignments, to Monsanto Company, a corporation of Delaware
No Drawing. Filed Mar. 17, 1960, Ser. No. 15,540
19 Claims. (Cl. 260—47)

This invention relates to the production of novel synthetic linear condensation polymers. The invention is particularly concerned with synthetic linear condensation polycarbonamides formed by condensing organic dicarboxylic acids and bis(aminopropoxyaryl)alkanes, as well as textile products, such as filaments, fibers, yarns, and the like produced therefrom, and a method for producing the said polycarbonamides.

Polyamides have been known in the art for many years. The known synthetic linear polyamides are prepared from polymerizable mono-aminocarboxylic acids or their amide forming derivatives, or from suitable diamines and suitable dicarboxylic acids or amide-forming derivatives of these compounds. These polyamides possess a number of physical properties such as toughness and high tensile strength that make them of great value in many applications. The preparation of such polymers are described in numerous patents. Unfortunnately the synthetic linear polyamides when exposed to light for fairly long periods of time undergo degradation that impairs their properties. By exposure to light these polyamides become badly discolored. The resulting discoloration is undesirable in certain applications. To overcome this light degradation problem the art has found it advantageous to incorporate in the synthetic linear polyamides compounds that tend to stabilize the polymers against light degradation. This obviously represents an aditional cost in the production of the polyamides. Therefore, there has existed a keen demand for a polyamide for the manufacture of textile filaments, fibers, yarns or the like and which possesses inherently a high degree of resistance to light degradation, while retaining many of the desirable properties of textile articles manufactured from the known synthetic linear polyamides, and yet which can be readily made and is amenable to being processed into filaments and other elongated flexible articles by conventional spinning and filament forming procedures and the like.

It is an object of the present invention to provide novel synthetic linear polyamides useful as fiber materials, film materials, and molded articles and characterized by their excellent light stability.

Another object of the present invention is to provide light stable fibers, filamentary materials, film materials, and molded articles manufactured from the novel and useful synthetic linear polyamides disclosed herein.

Still another object of the present invention is to provide a method for the manufacture of novel and useful synthetic linear polyamides that have improved resistance to light degradation.

Other objects of the invention will become apparent from the following description and claims.

In accordance with the invention a particular class of polyamide resins that avoid the disadvantages of prior art and are useful as a material from which fibers, films, molded articles and the like can be formed has been discovered. These polyamide resins are characterized by their resistance to degradation by the application of light thereon. In general, this group of novel polyamides embodied herein are prepared by effecting a reaction between a suitable organic dicarboxylic acid reactant or an amide-forming derivative of said dicarboxylic acid reactant and a particular class of diamines. The reaction is continued until a high molecular weight synthetic linear polyamide is formed.

In the preparation of the novel polyamide resins disclosed herein the organic dicarboxylic acid can comprise aromatic dicarboxylic acids, cyloaliphatic dicarboxylic acids, and saturated aliphatic dicarboxylic acids or amide-forming derivatives thereof in which the carboxyl groups are separated by at least two carbon atoms. The dicarboxylic acids should contain the two carboxyl groups as the sole reactive groups and generally are of the following formula:

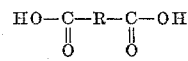

where R is a divalent organic radical free of reactive substituents, preferably a hydrocarbon.

More specifically R may be a polymethylene radical containing 2 to 8 or more recurring methylene groups. Specific examples of such dicarboxylic acids where R is a polymethylene radical include glutaric acid, adipic acid, suberic acid, azelaic acid, sebacic and higher acids of this series. It is to be understood that the invention is not confined, however, to the use of dicarboxylic acids in which the carboxyl groups are linked together by unsubstituted polymethylene chains. These groups may be linked as well as polymethylene chains containing substituents that are inert to the reactants used a substantially linear chain being desired in the polymer produced. Examples of dicarboxylic acids containing such chains are 1,3-dimethyl-glutaric acid, 2-methyl-adipic acid, 1,1- and 2,2-dimethyl adipic acid and 3-methoxy-adipic acid.

Furthermore, the carboxyl groups can be linked together by an arylene group, an alkylarylene group or a cycloalkylene group or like groups that can also contain inert substituents, if desired. For example, terephthalic acid, isophthalic acid, diphenic acid, phenylene-1,4-diacetic acid, 4- carboxyl-phenyl-acetic acid, 4-carboxyl-cyclohexyl-acetic acid, 2,2-bis(4-carboxyphenyl)propane, methoxyterephthalic acid and the like are within the purview of the invention. In addition, dicarboxylic acids containing hetero atoms that do not interfere with the reaction are not precluded from the scope of the invention, including for example bis(4-carboxyphenyl)sulfone. Furthermore, amide-forming derivatives of the dicarboxylic acids listed above can be usel. Amide-forming derivatives refers to those compounds which are acid derivatives but react with a diamine of the class described below to form recurring amide linkages. Such amide-forming derivatives include anhydrides, acid halides, half esters, and diesters that form amide linkages when reacted with primary or secondary amines. For example adipyl chloride and dimethyl esters of adipic acid would be amide-forming derivatives of adipic acid since both will undergo a condensation reaction with a diamine in much the same way the adipic acid would to produce the same type of polyamide resin.

The diamines employed in the preparation of the polyamides herein are bis(3-aminopropoxyphenyl)alkanes and may be represented by the following general formula:

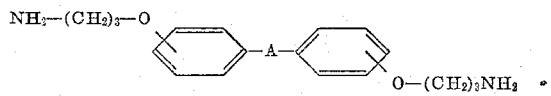

wherein A represents a lower alkylene group. The term "lower alkylene" refers to a lower aliphatic divalent saturated radical. The lower alkylene group can have a straight chain or a branched chain with up to and including eight carbon atoms in the chain. The aminopropoxy groups on the phenyl rings are in the 3,3'-, 4,4'-, or 3,4'-positions, the 4,4'-positions being preferred. It will be recognized that inert substituents such as lower alkyl radicals can be present on the aromatic rings. While the diamines are preferred to be a di-primary diamine, it will be understood that di-secondary amines and primary-secondary amines are within the purview of the invention provided the N-substituents do not interfere with the condensation reaction. For example N-(lower alkyl) and N,N'(lower alkyl) substituted diamines can be used if desired.

Thus, polyamides novel herein are characterized in the main by containing recurring units of the following structure:

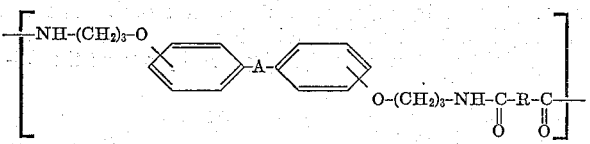

wherein R is a divalent organic radical free of reactive substituents and A is a lower aliphatic divalent saturated radical. The polymers having the aforesaid structure can be derived by polymerization methods hereinafter disclosed.

The polyamides embodied herein can be prepared in a variety of ways. For example, they can be prepared by heating in substantially equimolecular amounts an organic dicarboxylic acid and a bis(3-aminopropoxyphenyl)alkane under condensation polymerization conditions, generally from about 100 to about 325° C., in the presence or absence of an inter diluent until relatively high molecular weight linear condensation polyamides are obtained, and preferably until the polyamides possess fiber-forming properties and exhibit cold-drawable characteristics. Moreover, the diamine and dicarboxylic acid may be intimately mixed in proper proportions with the mixture being subjected to condensation polymerization conditions wherein the first reaction that occurs is the formation of diamine-dicarboxylic salts, followed by polymerization in the second step to formation of polyamides. At the high temperatures which may be employed, the polymerizing mixture is susceptible to oxidation by air, or even traces of oxygen. Oxidation causes darkening and degradation of the polymer. Accordingly, it is desirable to exclude oxygen from the reaction vessel where elevated temperatures are employed. This can be accomplished by sweeping out the vessel with nitrogen or other inert gas prior to the initiation of the reaction and maintaining the oxygen-free atmosphere in the reactor during the polymerization.

It is possible and sometimes desirable to prepare the polyamides of this invention by an interphase polymerization procedure that brings together for reaction at about room temperature an organic diamine and a diacid halide of an organic dicarboxylic acid initially existing in separate substantially immiscible liquid phases at least one of which contains a diluent. The process for the preparation of the polyamides herein by interphase polymerization can be carried out over a considerable range of temperatures. However, in view of the rapidity with which the polyamides are formed at moderate temperatures, there is no real advantage in using temperatures higher than 150° C.; and it is preferred that the reaction be carried out at about room temperature. At room temperature it is often desirable that the two phases containing the separate reactants be rapidly stirred, sufficient to produce an emulsion of fine particle size. When such an emulsion is provided, the diamine and the diacid halide of the dicarboxylic acid are completely reacted in a matter of at most a few minutes, depending to some extent on the reaction conditions employed. The solvent or diluent must not destroy the amide forming potentiality of the reactants. The concentration of the reactants in the separate phases can vary over wide limits and one still can produce a high molecular weight polyamide. It is advantageous to employ emulsifying agents to assist in suspending one liquid phase in the other. It is likewise desirable to use an acid acceptor for the hydrogen halide that is produced in the course of the reaction of an organic diamine and an organic dicarboxylic acid halide derivative. The diamine itself can serve as the acceptor. However, to avoid the need of an excess diamine reactant, one may add a sufficient amount of an acid acceptor in the amount which is equivalent to the amount of hydrogen halide produced. The acid acceptor may be sodium hydroxide, sodium carbonate, or a tertiary amine, and the like.

The diamine compounds employed to produce the polyamide of this invention are synthesized most conveniently from bis(hydroxyphenyl)alkanes. If such compounds are used as the starting material, the bis(hydroxyphenyl)-alkanes are converted first to the corresponding bis(2-cyanoethoxyphenyl)-alkanes by the dicyano-ethylation thereof. The resulting bis(2-cyanoethoxy)-phenyl alkanes are converted to the corresponding diamines by catalytic hydrogenation thereof.

The bis(4-hydroxyphenyl)alkanes are the preferred starting materials and are synthesized by methods known in the art. One of these diols commonly referred to as bisphenol-A can be obtained, for example, by reacting phenol with acetone under appropriate reaction conditions. Bisphenol-A structurally is 2,2-bis(4-hydroxyphenyl)propane and is the preferred starting material for the preparation of the diamine since it is readily available on the market.

Other bis(hydroxyphenyl)alkanes suitable as the starting material for the preparation of the novel diamine compounds of this invention include 2,2-bis(3-hydroxyphenyl)propane; 2,2(3-hydroxyphenyl, 4-hydroxyphenyl)-propane; bis(4-hydroxyphenyl)methane, 1,1-bis(4-hydroxyphenyl)ethane; 1,1-bis(4-hydroxyphenyl)propane; 1,1-bis(4-hydroxyphenyl)butane; 1,1-bis(4-hydroxyphenyl)heptane; 2,2-bis(4-hydroxyphenyl)butane; 2,2-bis(4-hydroxyphenyl)pentane; 2,2-bis(4-hydroxyphenyl)-heptane; 2,2-bis(4-hydroxyphenyl)octane; 3,3-bis(4-hydroxyphenyl)heptane; 2,2 - bis(3 - methyl, 4 - hydroxyphenyl)propane; 2,2-bis(3-isopropyl, 4-hydroxyphenyl)-propane; and the like. The corresponding diamines produced from the just mentioned bis(hydroxyphenyl)alkanes are 2,2-bis[3-(3'-aminopropoxy)phenyl]propane; 2,2-[3-(3'-aminopropoxy)phenyl, 4-(3'-aminopropoxy)phenyl]-propane; bis[4-(3'-aminopropoxy)phenyl]methane; 1,1-bis[4 - (3' - aminopropoxy)phenyl]ethane; 1,1-bis[4-(3'-aminopropoxy)phenyl]propane; 1,1-bis[4-(3'-aminopropoxy)phenyl]butane; 1,1 - bis[4 - (3' - aminopropoxy)-phenyl]heptane; 2,2 - bis[4-(3' - aminopropoxy)phenyl]-butane; 2,2 - bis[4 - (3' - aminopropoxy)phenyl]pentane; 2,2-bis[4-(3'-aminopropoxy)phenyl]heptane; 2,2 - bis[4-(3' - aminopropoxy)phenyl]octane; 3,3-bis[3-(3'-aminopropoxy)phenyl]heptane; 2,2-bis[3-methyl, 4-(3'-aminopropoxy)phenyl]propane; 2,2 - bis[3 - isopropyl, 4 - (3'-aminopropoxy)phenyl]propane; and the like.

The bis(hydroxyphenyl)alkanes used as the starting materials for the preparation of the diamine reactant readily form dicyanoethylated derivatives that are novel insofar as is known. Obviously, the particular bis(hydroxyphenyl)alkane used will be determined by the diamine desired for use in the preparation of the polyamide. The dicyanoethylated derivatives can be formed by reacting the selected bis(hydroxyphenyl)alkanes with acrylonitrile. The reaction can be carried out by contacting the selected bis(hydroxyphenyl)alkane with acrylonitrile, preferably in the presence of a catalytic amount of a suitable basic catalyst stable under the reaction conditions. Such types of catalyst that are preferably present during the dicyanoethylation to increase the speed of reaction include alkali metal alkoxides, for example sodium tertiary butoxide. Among other specific cyanoethylation catalysts are Triton B, pyridine, quinoline, N,N-dimethylaniline, and sodium or potassium tertiary amylate.

It has also been found advantageous to include in the reaction mixture a suitable quantity of material such as cuprous chloride which tends to inhibit the self-polymerization of acrylonitrile. Generally speaking the cyanoethylation reaction can be carried out in conventional equipment, such as in an autoclave. The temperature and pressure of the reaction mixture composed of the selected bis(hydroxyphenyl)alkane, acrylonitrile, catalyst and a polymerization inhibitor are raised to initiate the reaction between the bis(hydroxyphenyl)alkane and acrylonitrile and to cause the reaction to go to completion within a reasonable length of time. The exact temperatures and pressures employed will depend somewhat upon the particular bis(hydroxyphenyl)alkane and the relative quantities of the materials in the reaction mixture; however, the reaction mass, for best results, should be maintained mainly in a liquid phase. The polymerization inhibitor need not be totally soluble in the reaction mixture.

Obviously, the molar quantity of acrylonitrile employed should be at least twice that of the bis(hydroxyphenyl)alkane since two moles of acrylonitrile will react with one mole of the bis(hydroxyphenyl)alkanes. Acrylonitrile is preferably employed in substantial excess of that required for a stoichiometric dicyanoethylation, although such excess is not critical for optimum yields of the intermediate dinitriles. Excess acrylonitrile facilitates the reaction and is preferred in that the bis(hydroxyphenyl)alkanes that are normally solids will tend to dissolve in the excess acrylonitrile thus providing an advantageous reaction medium. For example, when twelve or more moles of acrylonitrile are employed per mole of bis(hydroxyphenyl)alkane in one method excellent results are obtained. If desired, the dicyanoethylation reaction can be carried out in the presence of a suitable organic inert solvent. Examples of suitable solvents are diethyl ether, benzene, dioxane, pyridine, cyclohexane, and the like. The reaction can be carried out under anhydrous conditions or in the presence of some water. After reaction goes to completion, the thus-produced dinitrile, bis[(2-cyanoethoxy)phenyl]alkane, is separated and purified before the dinitrile is reduced to the desired diamine. These separation and purification steps are accomplished by conventional techniques. For instance, the dinitriles can be isolated before the final hydrogenation by extraction, distillation, or other suitable means known in the art. In general, it is desirable to purify the dinitriles and the diamines by distillation.

The intermediate dinitriles are subsequently hydrogenated to diamines. Various catalysts and reaction conditions can be employed. Stated another way more specifically, the bis(aminopropoxyphenyl)alkanes comprising the diamine reactant used to prepare the polyamide of the present invention can be produced by catalytically reducing the corresponding bis[(2-cyanoethoxy)phenyl]alkanes. Reduction can be effected by the use of hydrogen gas under hydrogenating conditions of elevated temperatures and pressures. In general, the hydrogenation reaction can be carried out in the usual hydrogenation equipment and with the usual hydrogenation techniques for converting dinitriles to diamines. Temperatures of 80 to 150° C. can be used, although a temperature range of 85 to 100° C. is preferred. Pressures of 2500 to 5000 p.s.i.g. are feasible, although best results have been obtained with pressures ranging from 3000 to 3500 p.s.i.g. The exact temperatures and pressures used depend somewhat on the particular dinitrile being hydrogenated to its corresponding diamine. Ammonia usually should be employed during the hydrogenation to minimize the formation of polyamines due to inter-molecular loss of ammonia. The reduction reaction is catalyzed by the use of hydrogenation catalysts such as Raney nickel or Raney cobalt and others. The amount of catalyst is not critical. After the desired hydrogenation is complete, the thus-produced bis[(3-aminopropoxy)phenyl]- alkane is separated by the usual processes. Ordinarily the separation is most conveniently accomplished by distillation.

The following examples are given for the purpose of illustrating the invention, the parts being parts by weight unless otherwise indicated.

Example I 2,2-bis[4-(3'-aminopropoxy)phenyl]propane was prepared.

High purity bisphenol A which chemically is 2,2-bis(4-hydroxyphenyl)propane was added to a laboratory-type metal reaction vessel or autoclave. The bisphenol A had a melting point between 160.5–162° C. The vessel was of the type adapted for conducting high pressure reactions therein and had a capacity of two liters. The vessel was equipped with means for heating and means for stirring the contents therein, a pressure guage, and a safety blow-out valve. The amount of bisphenol A added was 91.2 grams (0.4 mole). Dry sodium tertiary-butoxide was added to the vessel in the amount of 0.8 gram, the function of this basic compound being to catalyze the dicyanoethylation reaction to be conducted in the vessel. Four grams of cuprous chloride for stabilizing the acrylonitrile subsequently added was also placed in the reaction vessel. The ingredients thus-added to the vessel were mixed well. Then, relatively cold, unstabilized acrylonitrile was poured cautiously onto the resulting mixture. A notably vigorous reaction occurred when the acrylonitrile came into contact with the catalyst; but the reaction subsided rather quickly. Addition of the acrylonitrile was continued until 400 ml. (6+moles) thereof had been added. The reaction vessel containing the ingredients just mentioned was closed to the atmosphere. The reaction mixture was stirred and heated to 100° C. during one hour and then stirred and heated at 104± 4° C. for an additional 17.5 hours under autogenous pressures of 13.5–20.0 p.s.i.g. to form the intermediate dinitrile. Thereafter the reaction mixture was cooled to room temperature.

Unreacted acrylonitrile was removed from the reaction mixture by subjecting the mixture to a sufficiently reduced pressure to evaporate the acrylonitrile therefrom. The acrylonitrile so removed was collected for re-use in a flask partly immersed in a solid $CO_2$-acetone bath. The residue was dissolved in 500 ml. of chloroform and the resulting solution was filtered. The filtrate containing the dinitrile reaction product was washed successively with five 100-ml. portions of 5% aqueous sodium hydroxide solution, two 125-ml. portions of 5% hydrochloric acid and one 250-ml. portion of water. The washed organic solution was dried over anhydrous sodium sulfate, filtered and subjected to conditions so as to distill the chloroform therefrom. The residue was a buff-colored solid that weighed 98.6 grams. The residue was dissolved in hot ethanol and the hot solution was contacted with activated carbon. After being filtered, the solution was cooled to precipitate the dinitrile. Purification by the recrystallization technique with ethanol was repeated three additional times. The precipitated material was the dinitrile, 2,2,-bis[4-(2'-cyanoethoxy)phenyl]propane, which had a melting point of 78–79° C. and a slightly buff color. The yield was 60% of the theoretical yield. This dinitrile material was combined with like material similarly produced during additional runs. The combined samples (about 185 grams) were recrystallized twice from 700-ml. portions of the carbon tetrachloride-ethanol azeotrope (84% $CCl_4$ and 16% ethanol by weight). The purified dinitrile weighed 172.5 grams and the dinitrile exhibited a melting point of 80–80.5° C. Analysis of the dinitrile showed that it was composed of 75.72% carbon, 6.41% hydrogen, and 8.28% nitrogen. The calculated amounts of these elements in 2,2-bis[4-(2'-cyanoethoxy)phenyl]propane are 75.42% carbon, 6.63% hydrogen, and 8.38% nitrogen.

One hundred and sixty-four grams (0.49 mole) of the dinitrile was dissolved in 250 ml. of 1,2-dimethoxy-ethane, and the resulting solution was charged to a steel hydrogenation reactor of 1410-ml. capacity, along with 25 grams of freshly prepared Raney cobalt catalyst and 97 grams of ammonia. The reactor was jacketed for heating and cooling the contents therein and was equipped with efficient agitating means. The reactor was closed to the atmosphere, and hydrogen was added to the stirred mixture to pressurize the reactor. The temperature was adjusted, and the hydrogenation proceeded smoothly between 84–118° C. and at a pressure of 2900–3200 p.s.i.g. Hydrogen was added as needed to maintain the pressure. After hydrogenation was complete, the catalyst was removed from the cooled reaction mixture by filtration under a nitrogen blanket. The solvent was then removed under reduced pressure, leaving 163 grams of a viscous caramel-colored liquid. Distillation of the liquid through a simple Claisen-type distilling head gave 138 grams of a colorless viscous liquid which was identified as 2,2-bis[4-(3'-aminopropoxy)phenyl]propane. This liquid displayed a boiling point of 216–217° C. at 0.4 mm. Hg absolute pressure. There was no forecut and the residue was composed of 22 grams of a dark viscous liquid that probably was largely the desired diamine. No signs of decomposition of the diamine during the distillation thereof were noted, indicating that the novel diamine is heat stable. A sample of the distilled diamine had the following analyses: carbon—73.79%; hydrogen—8.22%; and nitrogen—8.12%. The calculated percentages of these elements in 2,2-bis[4-(3'-aminopropoxy)phenyl]propane are carbon—73.65%; hydrogen—8.83%; and nitrogen 8.18%.

*Example II*

Bis[4-(3'-aminopropoxy)phenyl]methane was prepared.

Sixty grams of bis(4-hydroxyphenyl)methane (M.P. 159–160° C.), 0.6 gram of sodium t-butoxide catalyst, and 3.0 grams of cuprous chloride stabilizer was added to the reaction vessel described above in Example I. The ingredients thus-added to the vessel were mixed well. Then, relatively cold, unstabilized acrylonitrile was poured slowly and cautiously onto the resulting mixture. Notably vigorous reaction occurred when the acrylonitrile came into contact with the catalyst; but the reaction subsided rather quickly. Addition of the acrylonitrile was continued until 300 ml. thereof had been added. The reaction vessel containing the ingredients just mentioned was closed to the atmosphere. The reaction mixture was stirred and heated to 100° C. during one half hour and then heated and stirred at 104±4° C. for an additional 17.5 hours under autogenous pressures of 20–23 p.s.i.g. to form the intermediate dinitrile. Thereafter, the reaction mixture was cooled to room temperature.

Unreacted acrylonitrile was removed from the reaction mixture by subjecting the mixture to a sufficiently reduced pressure to evaporate the acrylonitrile therefrom. The acrylonitrile so removed was collected for re-use in a flask partly immersed in a solid $CO_2$-acetone bath. The residue was taken up in 425 ml. of chloroform, and the resulting mixture was filtered with suction through a Büchner funnel. The filtrate was washed successively with five 100-ml. portions of 5% aqueous sodium hydroxide solution, five 100-ml. portions of 5% hydrochloric acid and two 250-ml. portions of water, the last water washing being neutral to "pHydrion" paper. The washed organic solution was then dried over anhydrous sodium sulfate, filtered and stripped of solvent under reduced pressure. The resulting residue was recrystallized successively from 125 ml. of 4:1 dioxane-water, 110 ml. of dioxane and 50 ml. of dioxane, yielding 30.3 grams of the dinitrile bis[4-(2'-cyanoethoxy)phenyl]methane having a melting point of 115.5–116° C. (sinters, 115° C.). Concentration of the combined mother liquors to dryness and recrystallization of the residue, first from 65 ml. of ethyl acetate and then from 60 ml. of 5:5:2 dioxane-ethanol-water solution yielded an additional 11.0 grams of the desired dinitrile. The yield of dinitrile, based on unrecovered bis(4-hydroxyphenyl)methane, was 64.2%. Analysis of the dinitrile produced showed that it was composed of 8.99% nitrogen. The calculated amount of nitrogen in bis[4-(2'-cyanoethoxy)phenyl]methane is 9.15%.

Thirty and three-tenths grams of the dinitrile produced was dissolved in 500 ml. of 1,2-dimethoxyethane. The resulting solution was charged to the hydrogenation reactor, as in the prior example, along with 10 grams of freshly-prepared Raney cobalt catalyst and 115 gms. of ammonia. The reactor was closed, and hydrogen was added to the stirred mixture to pressurize the reactor. The temperature was adjusted, and the hydrogenation proceeded smoothly between 84–116° C. in a pressure range of 3280–3460 p.s.i.g. Hydrogen was added to the reactor as needed to maintain the pressure. After hydrogenation was complete, the catalyst was removed from the reaction mixture by filtration under a nitrogen blanket; and the solvent was removed from the filtrate under reduced pressure. The resulting residue was flash distilled at 0.5 gm. of Hg absolute pressure, with all distillate boiling up to 240° C. being collected. This distillate was redistilled through a 4" Vigreux column (Mini-lab), and 19.5 grams of distillate boiling at 219–222° C. at 0.5 mm. of Hg absolute pressure was collected. There were no indications of decomposition during the distillation; and the clear, colorless distillate solidified slowly on standing at room temperature. The amount of purified diamine thus-produced represents a 62.1% yield based on the dinitrile compound charged to the hydrogenation reactor. Analysis of the diamine produced showed that it was composed of 7.70% nitrogen. The calculated amount of nitrogen in bis[4-(3'-aminopropoxy)phenyl]methane is 8.91. The low nitrogen analysis in the diamine produced was probably due to the presence of some carbonate impurity.

*Example III*

Into a Waring Blendor equipped for high speed stirring, 275 ml. of water, 10 ml. of chloroform, a slight excess over 0.02 mole of 2,2-bis[4-(3'-aminopropoxy)phenyl]propane, 45 ml. of 1.0 N potassium hydroxide and 0.3 gm. of Dupanol ME (Du Pont Co., sodium lauryl sulfate) were added. The chloroform was employed to suspend the acid chloride subsequently added and to act as a swelling agent for the polymer produced. The base was employed to accept the hydrogen halide produced during the condensation reaction, and the Dupanol ME was added as an emulsifying agent. At room temperature, the mixture was emulsified by agitation in the Waring Blendor; and 0.02 mole of terephthaloyl chloride dissolved in 40 ml. of chloroform was added gradually over a period of 1–2 minutes to the rapidly stirred emulsion. Two 5 ml. portions of chloroform were used to transfer quantitatively the diacid chloride. The stirring was continued for two minutes; and 1.0 N hydrochloric acid was added to the emulsion to acidify the reaction mixture. Five to ten ml. of acid was sufficient to break the emulsion sharply.

The precipitated polymer was collected by filtration and washed once with ethanol on the filter and again by re-slurrying the polymer in ethanol. Then the polymer was washed with a dilute base to dissolve any water insoluble acid which may have been present. The polymer was washed free of base and dried under vacuum at 50° C. A yield of 8.5 gms. was obtained—92% of theoretical. A melting point of the polymer was taken on a Fisher-Jones melting point apparatus. The polymer produced exhibited a melting point of 220–225° C. The polymer was stable in the melt. The polymer so formed yielded filaments that were cold-drawable. The specific viscosity of the polymer was 0.38, as measured by dissolving 0.5 gm. of the polymer in 100 ml. of m-cresol and comparing the viscosity of the polymer solution against the viscosity of the solvent in a manner well known in the art.

Example IV

Into the Waring Blendor 275 ml. of water, 10 ml. of chloroform, a slight excess over 0.015 moles of 2,2-bis[4-(3'-aminopropoxy)phenyl]propane, 30 ml. of 1.0 N sodium hydroxide and 0.3 gm. of Dupanol ME were added. At room temperature the mixture was emulsified by agitation in the blender; and 0.015 mole of 2,3,5,6-tetrachloroterephthaloyl chloride dissolved in 40 ml. of chloroform was added gradually over a period of 1–2 minutes to the rapidly stirred emulsion. Two 5 ml. portions of chloroform were used to transfer quantitatively the diacid chloride. The stirring was continued for two minutes; and 1.0 N hydrochloric acid was added to the emulsion to acidify the reaction mixture in an amount sufficient to break the emulsion sharply.

The polymer was purified in accordance with the procedure outlined above in Example III. A yield of 7.7 gms. was obtained—84% of theoretical. It was found that the polymer produced exhibited a melting point of 306–310° C. Cold-drawable filaments were formed from a melt of the polymer. The specific viscosity of the polymer was 1.1 as measured above.

Example V

Into the Waring Blendor 200 ml. of water, 10 ml. of chloroform, a slight excess over 0.02 mole of bis[4-(3'-aminopropoxy)phenyl]methane, 45 ml. of 1.0 N sodium hydroxide and 0.3 gm. of Dupanol ME were added. At room temperature the mixture was emulsified by agitation in the blender; and 0.02 mole of terephthaloyl chloride dissolved in 40 ml. of chloroform was added gradually over a period of 1–2 minutes to the rapidly stirred emulsion. Two 5 ml. portions of chloroform were used to transfer quantitatively the diacid chloride. The stirring was continued for two minutes; and 1.0 N hydrochloric acid was added to the emulsion to acidify the reaction mixture in an amount sufficient to break the emulsion.

The polymer was purified in accordance with the procedure outlined above in Example III. The yield of polymer obtained was 8.0 gms. or 90% of theory. It was found that the polymer produced exhibited a melting point of about 285° C. Cold-drawable filaments were formed from a melt of the polymer. The specific viscosity of the polymer was 0.19 as measured above.

Example VI

The terephthalic acid salt of 2,2-bis[4-(3'-aminopropoxy)phenyl]propane was prepared in the following manner:

Equimolecular quantities (0.067 mole) of the said diamine and terephthalic acid were dissolved separately in 200 ml. quantities of dimethyl formamide. These solutions were mixed and the precipitation of the salt occurred immediately. The salt was separated by filtration, washed with isopropanol, and dried.

A 20.9 gm. sample of this salt and 20 ml. of water were placed in a stainless steel autoclave equipped for stirring the contents therein. After heating for 45 minutes, a reaction temperature of 218° C. and a pressure of 250 p.s.i.g. were attained. The pressure was held at this pressure by bleeding off part of the water of reaction for 13 minutes during which time a temperature of 242° C. was reached. The pressure was then gradually released to zero over a period of 25 minutes. The pressure was then reduced to 100 mm. of Hg in an additional 30 minutes and held at this level for 10 minutes. Finally the pressure was raised to zero (p.s.i.g.) by the use of nitrogen gas. The maximum temperature obtained was 248° C.

A spinneret having an orifice of 0.02 inch diameter was attached and a monofilament was extruded from the molten polymer inside the autoclave by the application of pressure. This filament could be cold-drawn to become crystalline and opaque. Physical testing of the drawn filament gave the following data:

Tenacity—4.1 gm./den.
Elongation—12%
Initial modulus—36.0 gm./den.

When the above examples are repeated with other defined diamines and dicarboxylic acids, similar advantageous results are obtained. For example, when terephthalic acid, isophthalic acid, adipic acid, sebacic acid, glutaric acid, suberic acid, azelaic and other dicarboxylic acids of the type and amide-forming derivatives thereof are employed with other diamines of the above defined class such as 1,1-bis[4-(3'-aminopropoxy)phenyl]ethane and the like under proper reaction conditions useful polymers are formed.

While the invention includes the production of polymers of relatively low molecular weight that are useful in the manufacture of coating compositions, lacquers, and the like, it is primarily concerned with the production of polymers that have film and filament-forming properties. It is preferred that the molecular weight be above 10,000 and up to 80,000 or higher. Filaments may be produced by melt spinning, i.e., by extruding a melt of the polymer through suitable orifices in a spinneret and into a cooling atmosphere. The streams of polymer that emerge vertically downwardly from the spinneret solidify in the atmosphere to form filaments.

Filaments may also be produced by conventional wet spinning where a solution of the polymer is extruded through orifices in a spinneret and into a liquid coagulating bath or by conventional dry spinning where a solution of the polymer is extruded through orifices in a spinneret and into a medium containing an evaporative gas. If the polymer has a sufficiently high molecular weight, the filaments so-formed may be cold drawn into filaments having good physical properties.

In producing the polyamides of the present invention, the polymerization may be carried out in the presence of catalysts, as well as in the presence of molecular weight regulators and the like, if desired. Other additives that modify the polymer such as delustrants, plasticizers, pigments, colorants, and oxidation inhibitors may also be incorporated in the polymer if desired. The polymerization may be conducted in batch lots, by continuous methods, or by semi-continuous methods. In general, the process employed to prepare the novel linear polyamides involves a polymerization reaction which is easily controlled and requires no special equipment.

It will be apparent from the foregoing description that the present invention provides a new class of polyamides and a method for producing same. A particular advantage of the invention is that the polymers produced display excellent light stability. A further advantage of the invention is that the reaction between the diamine and dicarboxylic acid can be carried to completion in a reasonable time at sub-atmospheric, atmospheric, or super-atmospheric pressure and at relatively low or elevated temperature. Furthermore, polymers having fiber-forming properties and displaying melting points above 200° C. are obtainable. Other advantages are readily apparent.

It is not intended that the invention be limited to the details of the embodiments set forth above as it will be recognized that numerous and obvious modifications conforming to the spirit of the invention can be made. Therefore, it is intended that the invention be limited solely by the scope of the appended claims. For example, it will be recognized interpolymers may be prepared by including in the polymerization reaction mass desired amounts of mono-amino-carboxylic acids like 6-aminocaproic acid. However, it is preferred that the polyamides be composed predominantly (at least 80%) of the amide recurring units whose structural formula is given above.

What is claimed is:

1. A linear carbonamide polymer composed essentially of recurring structural units having a formula selected from the group consisting of:

(I)
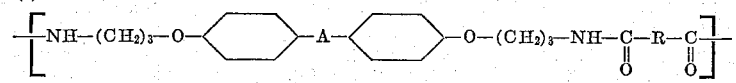

(II)
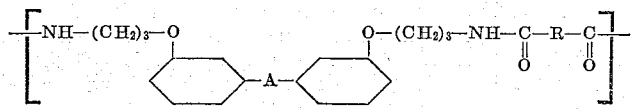

and (III)
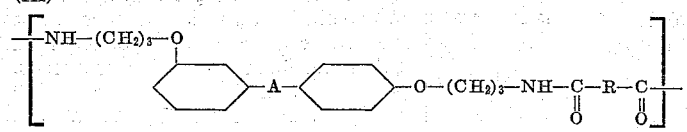

wherein R is a divalent hydrocarbon radical of 2 to 8 carbon atoms and A is a lower aliphatic divalent hydrocarbon radical of 1 to 8 carbon atoms wherein a single carbon atom bears both aminopropoxyphenyl substituents.

2. The polymer of claim 1 further characterized by having a molecular weight in excess of 10,000.

3. The polymer of claim 2 wherein R is the residue of an aromatic dicarboxylic acid.

4. The polymer of claim 1 wherein the structural unit is that of Formula No. I.

5. A linear terephthalamide polymer having fiber-forming properties and composed essentially or recurring structural units of the formula

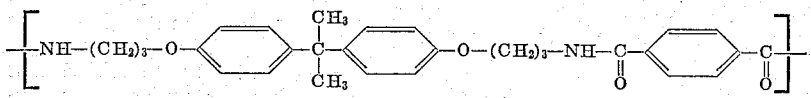

6. A linear terephthalamide having fiber-forming properties and composed essentially of structural units of the formula

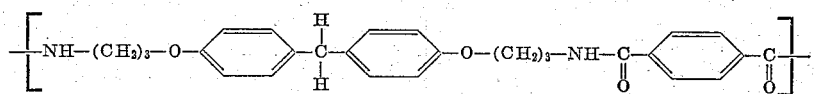

7. A linear terephthalamide having fiber-forming properties and composed essentially of structural units of the formula

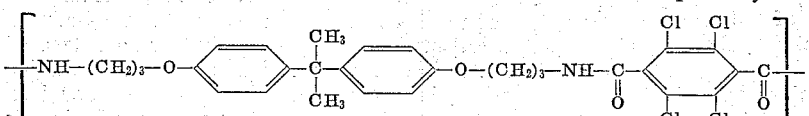

8. A fiber of the polymer of claim 5.
9. A fiber of the polymer of claim 6.
10. A fiber of the polymer of claim 7.
11. A method of producing linear carbonamide polymers comprising reacting together substantially equimolar amounts of a compound selected from the group consisting of a dicarboxylic acid of the general formula:

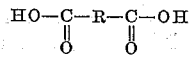

wherein R is a divalent hydrocarbon radical of 2 to 8 carbon atoms and amide-forming derivatives thereof and a compound selected from the group consisting of a diamine of a general formula selected from the group consisting of:

(IV)
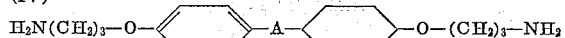

(V)

and (VI)
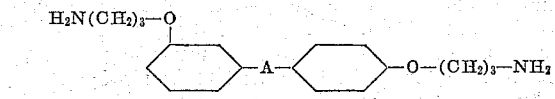

wherein A is a lower aliphatic divalent hydrocarbon radical of 1 to 8 carbon atoms wherein a single carbon atom bears both aminopropoxyphenyl substituents and amide-forming derivatives thereof.

12. The method of claim 1 wherein the reaction is continued until the resulting polymer attains a molecular weight in excess of 10,000.

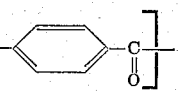

13. The method of claim 11 wherein the reaction takes place at an elevated temperature.

14. A method of producing a linear terephthalamide polymer comprising reacting substantially equimolar amounts of bis[4(3'-aminopropoxy)phenyl]methane and terephthaloyl chloride by bringing together the diamine

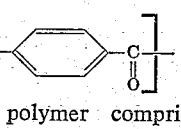

and the dicarboxylic acid chloride initially existing in substantially immiscible liquid phases containing a diluent in the presence of an acid acceptor and by continuing the reaction until the resulting polymer exhibits fiber-forming properties.

15. The method of claim 11 wherein the reaction is an interphase polymerization induced by bringing together for reaction the diamine and the dicarboxylic acid in the form of an acid halide initially existing in separate substantially immiscible liquid phases containing a diluent.

16. A method of producing a linear terephthalamide polymer comprising reacting together at an elevated temperature of from about 100° to 325° C. substantially

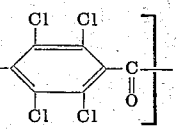

equimolar amounts of 2,2-bis[4-(3'-aminopropoxy)-phenyl]propane and terephthalic acid and continuing the heat treatment until the resulting polymer exhibits fiber-forming properties.

17. A method for producing a linear terephthalamide polymer comprising reacting together at an elevated temperature of from about 100° to 325° C. substantially equimolar amounts of bis[4-(3'-aminopropoxy)phenyl]-methane and terephthalic acid and continuing the heat treatment until the resulting polymer exhibits fiber-forming properties.

18. A method of producing a linear terephthalamide polymer comprising reacting together substantially equimolar amounts of 2,2-bis[4-3'-aminopropoxy)-phenyl]propane and terephthaloyl chloride by bringing together the diamine and the dicarboxylic acid chloride initially existing in separate substantially immiscible liquid phases containing a diluent in the presence of an acid acceptor and by continuing the reaction until the resulting polymer exhibits fiber-forming properties.

19. A method of producing a linear terephthalamide polymer comprising reacting together substantially equimolar amounts of 2,2-bis[4-(3'-aminopropoxy)phenyl]-propane and 2, 3, 5, 6-tetrachloroterephthaloyl chloride by bringing together the diamine and the dicarboxylic acid chloride initially existing in separate substantially immiscible liquid phases containing a diluent in the presence of an acid acceptor and by continuing the reaction until the resulting polymer exhibits fiber-forming properties.

References Cited by the Examiner
UNITED STATES PATENTS

| 2,789,964 | 4/57 | Reynolds et al. | 260—47 |
| 2,878,235 | 3/59 | Butler et al. | 260—78 |
| 2,939,862 | 6/60 | Caldwell et al. | 260—47 |

FOREIGN PATENTS

| 1,056,144 | 4/59 | Germany. |

JOSEPH L. SCHOFER, *Primary Examiner.*

HAROLD N. BURSTEIN, LOUISE P. QUAST, DONALD E. CZAJA, *Examiners.*